United States Patent
Moffatt et al.

(10) Patent No.: US 8,464,248 B2
(45) Date of Patent: Jun. 11, 2013

(54) CONTEXTUAL DISCOVERY OF VALUE-ADDED COMPONENTS

(75) Inventors: Christopher H. Moffatt, Sammamish, WA (US); Jay Beavers, Duvall, WA (US); Ravipal Soin, Kirkland, WA (US); Scott Kurtzeborn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 12/484,819

(22) Filed: Jun. 15, 2009

(65) Prior Publication Data

US 2010/0318985 A1 Dec. 16, 2010

(51) Int. Cl.
*G06F 9/445* (2006.01)
(52) U.S. Cl.
USPC ............ 717/175; 717/168; 717/173; 717/178
(58) Field of Classification Search
USPC .................................. 717/168–178
See application file for complete search history.

(56) References Cited

U.S. PATENT DOCUMENTS

| | | | |
|---|---|---|---|
| 6,282,711 B1 * | 8/2001 | Halpern et al. | 717/175 |
| 6,523,166 B1 * | 2/2003 | Mishra et al. | 717/174 |
| 7,134,122 B1 * | 11/2006 | Sero et al. | 717/177 |
| 7,698,685 B2 * | 4/2010 | Pepin et al. | 717/120 |
| 7,788,398 B2 * | 8/2010 | Chapweske et al. | 709/233 |
| 8,065,674 B2 * | 11/2011 | Cavalaris et al. | 717/174 |
| 8,216,071 B2 * | 7/2012 | Lee et al. | 463/42 |
| 2006/0271924 A1 * | 11/2006 | Calcaterra et al. | 717/168 |
| 2007/0055943 A1 | 3/2007 | McCormack et al. | |
| 2008/0126984 A1 * | 5/2008 | Fleishman et al. | 715/810 |
| 2008/0244440 A1 | 10/2008 | Bailey et al. | |
| 2008/0244443 A1 | 10/2008 | Schaw et al. | |
| 2009/0172657 A1 * | 7/2009 | Makelainen et al. | 717/174 |
| 2010/0064177 A1 * | 3/2010 | Li et al. | 714/38 |

OTHER PUBLICATIONS

"Customize the Ribbon," Microsoft Corporation, 2009, http://office.microsoft.com/en-us/access/HA102114151033.aspx.
"Add-In Express," Add-in Express Ltd., 2009, http://www.add-in-express.com/docs/vcl-first-addin.php.
"Visual Studio Tools for Office 2008 Ribbon Designer with XLINQ for Yahoo," hackman3vilGuy, 2007, CodeProject, 2009, http://www.codeproject.com/KB/cs/vsto_ribbon_xlinq_yahoo.aspx?display=PrintAll&fid=909679&df=90&mpp=25&noise=3&sort=Position&view=Quick&select=2340440.
"Walkthrough: Creating a Custom Tab by Using the Ribbon Designer," Microsoft, 2008, http://social.msdn.microsoft.com/Forums/en-US/vs2010office/thread/13d514f7-e9fa-49e8-8893-3f1edc714bc0.

(Continued)

*Primary Examiner* — Wei Zhen
*Assistant Examiner* — Daniel P Elliott

(57) ABSTRACT

Embodiments of methods and systems of providing contextual discovery of value-added components or add-ins of an application are disclosed. In conjunction with a startup of the application, indicators for each available value-added component for the application may be contextually displayed on a user interface of a first computing device, where the indicators are undifferentiated based on installation status of the value-added components. Upon a user selection of a particular value-added component that is not currently installed, the value-added component may be obtained from a second computing device and may be installed. The end-user is thus provided with an integrated seamless, contextual discovery and installation of desired value-added components on an as-needed basis. The methods and systems may be based on varying levels of permission, and may be performed for sub-components of value-added components.

20 Claims, 4 Drawing Sheets

OTHER PUBLICATIONS

Faller, E., "Extend the 2007 Office System with Your Own Ribbon Tabs and Controls," Microsoft Corporation, 2009, http://msdn.microsoft.com/en-us/magazine/cc163469.aspx#S2.

Coan, B., "Customizing the Office 2007 User Interface," http://word.mvps.org/FAQS/Customization/CustomizeRibbon.htm.

Getz et al., "Customizing the 2007 Office Fluent User Interface Using Visual Studio 2005 Tools for the Office System SE (Part 1 of 2)," Microsoft Corporation, 2009, http://msdn.microsoft.com/en-us/library/bb964683.aspx#CustomizeUIUsingVSTOSE_CustomizingtheOfficeFluentRibbon.

* cited by examiner

CONTEXTUAL DISCOVERY OF VALUE-ADDED COMPONENTS

BACKGROUND

A value-added component of an application may be a discrete component that augments basic or standard operations or data of the application. Existing installation systems and methods for value-added components provide a disjoint, interruptive user experience. For example, to obtain additional functionality for an application, an end-user is typically required to actively browse a website, CD or other storage media to find or discover available value-added components for the application. Furthermore, the end-user may need to personally evaluate whether or not a particular add-in is desired or appropriate for his or her situation. The end-user must then take active steps to download any desired add-ins.

Moreover, any new available functionalities, updates and patches for the application may intrude on the end-user's experience by interrupting his or her work with pop-up windows and other seemingly randomly-timed notifications. The end-user must stop his or her work (or alternatively, must remember to address the subject of the interrupting pop-up window at a later time), evaluate the advertised subject matter for appropriateness to his or her work, and actively install it.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of a method of providing contextual discovery of value-added components of an application are disclosed. The method may display, in conjunction with a startup of the application, indications of one or more available value-added components (value-added components) for the application, where the indications are undifferentiated based on installation statuses (e.g., installed or not installed) of the available value-added components. At least a portion of the available value-added components may not be installed on a same computing device on which the application itself is installed. Upon receiving a user selection of one of the value-added components that is not installed on the computing device, the method may obtain the selected value-added component from at least one other computing device, install the selected value-added component onto the same computing device, and initiate an execution of the value-added component.

Embodiments of a system for enabling contextual discovery of value-added components of the user application are disclosed. The system may include a first computing device having a memory and a processor. The memory may include computer-executable instructions for a user application, a list of value-added components for the user application, and computer-executable instructions for a discovery application. The discovery application may include computer-executable instructions for displaying an indication of each value-added component on the list of value-added components. At least some of the value-added components on the list may not be installed on the first computing device, however, differences in installation statuses of the value-added components may not be apparent from the indications. The discovery application may include computer-executable instructions for receiving an indication of a selected value-added component, obtaining the selected value-added component from at least one second computing device, and installing the selected value-added component onto the first computing device.

In an exemplary embodiment, the indications of the value-added components may be selectable, graphical icons displayed on a ribbon-type user interface (UI). When a specific application is started by an end-user, a display area corresponding to the specific application may be presented and a set of selectable graphical icons corresponding to available value-added components for the specific application may appear in the display area. Each available value-added component may have one or more sub-components. Each of the one or more sub-components may be represented by corresponding sub-component indications in a corresponding display area when the available value-added component is selected. Any selected value-added component or selected sub-component that is not installed on the computing device may be obtained from another computing device, installed, and executed. In this manner, the end-user may be provided with contextual discovery of add-ins for the application and its value-added components, as well as a more integrated and seamless installation experience.

DRAWINGS

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
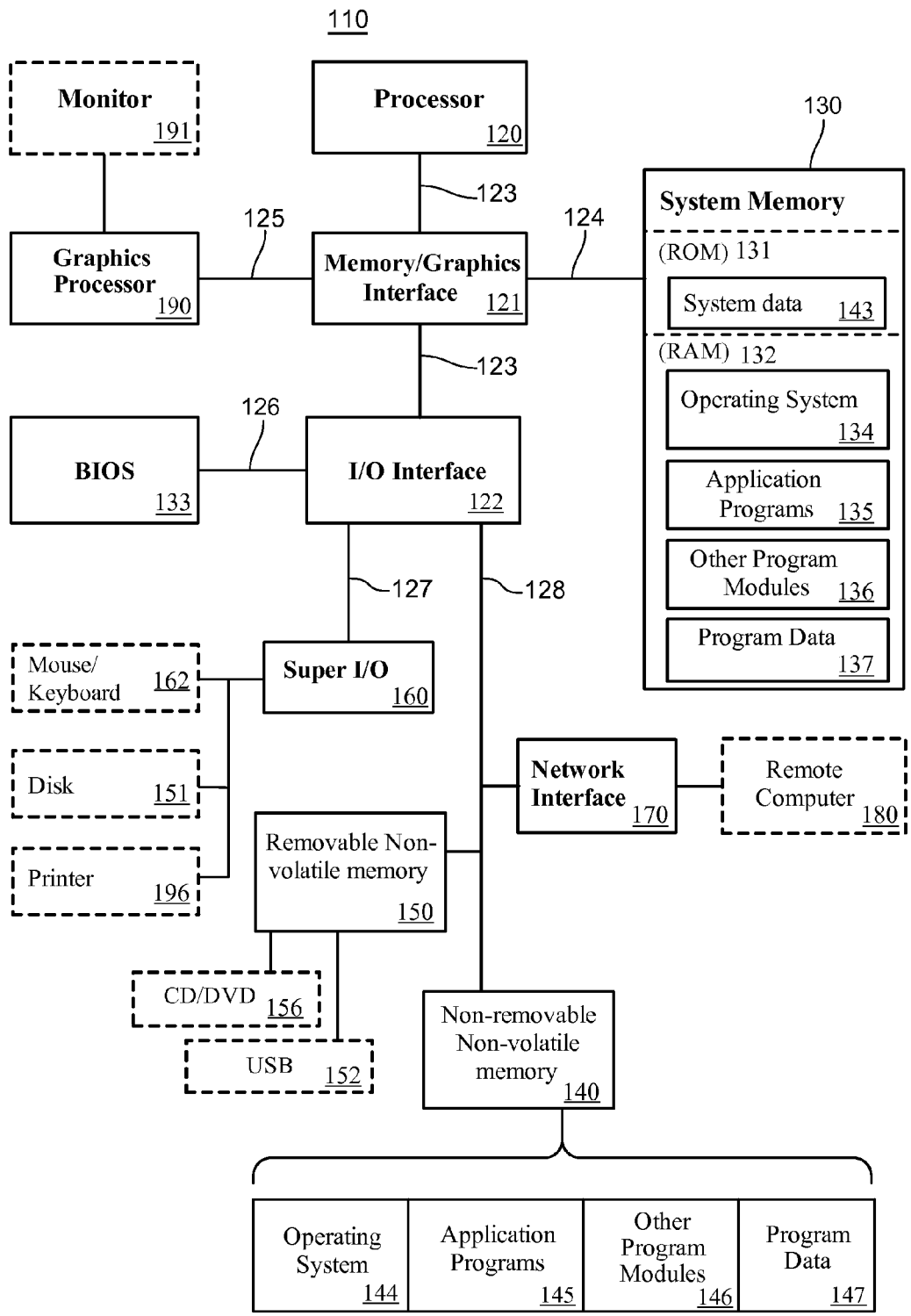
FIG. 1 illustrates an exemplary block diagram of a general purpose computing device.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as read/writeable disk 151, keyboard/mouse 162, and printer 196, as examples. The super I/O chip 160 may be connected to the I/O interface 121 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Networks may be wireless, wired, or a combination of the two. Such networking environments are commonplace in offices, enterprise-wide computer networks, intranets, and the Internet.

Computing device 110 may encompass many different computing device configurations. For example, computing device 110 may realized in hand-held devices, mobile phones, multi-processor systems, microprocessor-based or programmable consumer electronics, network PCs, mini-computers, mainframe computers, portable computing or communication devices, and or other computing device capable of both visual display and direct or indirect communication with another computing device.

Figure 2:
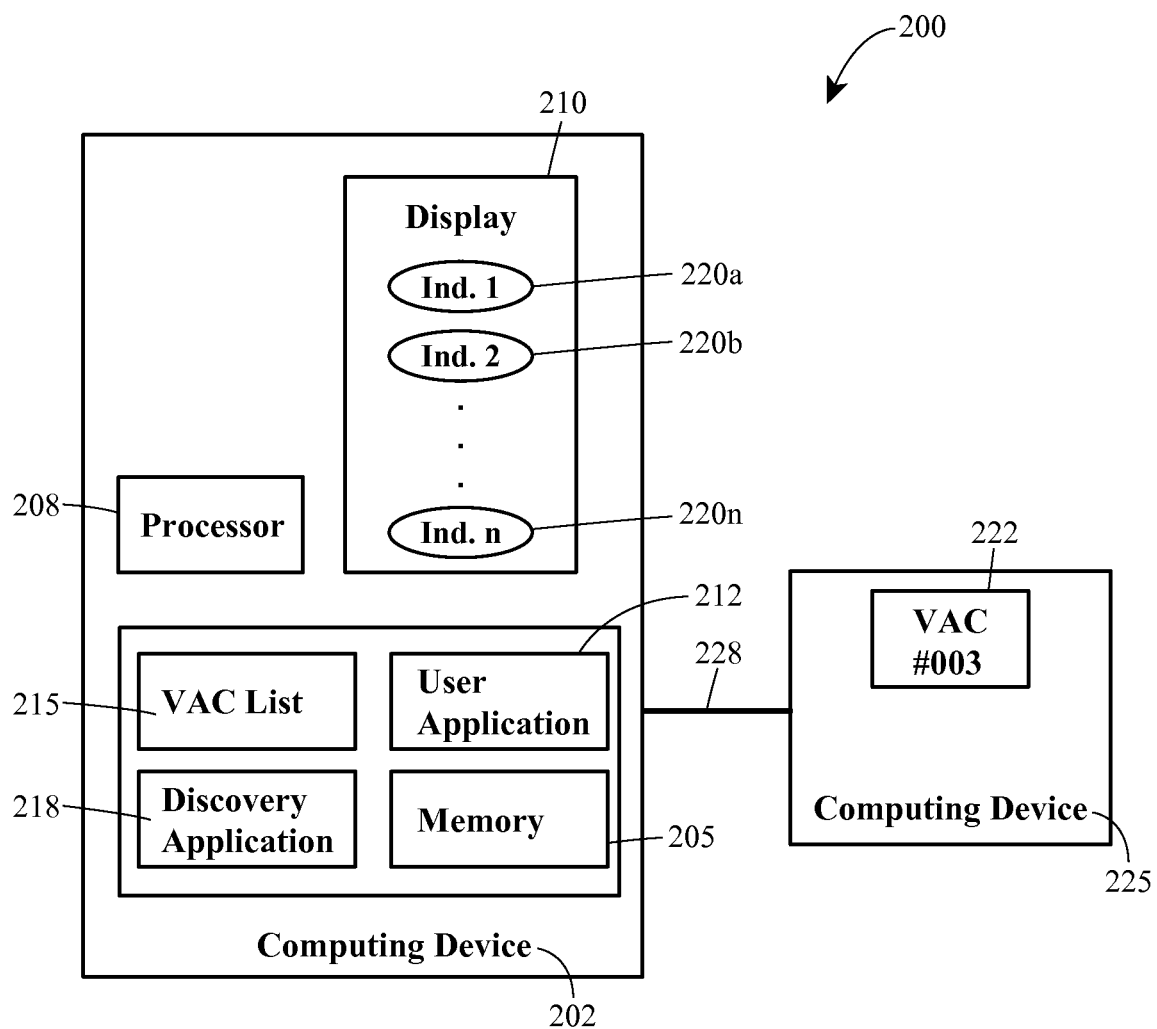
FIG. 2 depicts an embodiment of a system for providing contextual discovery of value-added components.

FIG. 2 depicts an embodiment of a system 200 for providing contextual discovery of value-added components. The system 200 may include a first computing device 202 that has a memory 205, a processor 208 and a display 210. In some embodiments, the first computing device 202 may be an embodiment of the computing device 110 of FIG. 1.

The memory 205 may have stored thereon computer-executable instructions corresponding to a user application 212 that is installed on the first computing device 202. The user application 212 may be any application or program that may be executed per a request of a user or end-user of the first computing device 202, via either a direct user command or as part of a routine or script. For example, the user application 212 may be a word processing program, a spreadsheet program, a presentation program, a note program, a database program, a scheduling or calendar program, or any other type of program or application for use by the end-user and installed on the first computing device 202. The user application 212 may be executed by the processor 208 and a user interface (UI) of the user application 212 may be presented on the display 210.

The memory 205 may also have stored thereon a list of available value-added components 215 corresponding to the user application 212. Value-added components may be discrete components that may augment basic or standard operations or data of the user application 212. Typically, a value-added component may not be required for a standard operation of the user application 212, but instead may extend additional functionality, capability and/or data to the basic user application 212. A value-added component may be an additional feature, routine or functionality that supplements basic user application 212 functionality, such as an add-in. Generally, a value-added component may be a same version as the basic user application 212, and thus typically may not be a new version, a patch or an update of the basic user application 212 itself.

For example, for a presentation program, a value-added component may be a "create poll" component that allows a creation of a real-time polling interaction with other computing devices corresponding to a particular presentation slide. In another example, for a word-processing program, a value-added component may be a "mathematical symbols" component that enables quick access to mathematical symbols such as the Greek alphabet, integral signs, fractions, exponents, equations, matrices, and so on. Other examples for these and other user applications 212 may be possible.

A value-added component may not be limited to being an add-in functionality, feature, or routine of the user application 212. In some embodiments, a value-added component may be an upgrade of the user application 212 or some portion of a new version of the user application 212. In some embodiments, a value-added component may be a patch, an update, an upgrade, a replacement or a fix for the user application 212. A value-added component may be security-related. In some embodiments, a value-added component may be an add-in or third-party add-in provided by an entity other than a provider of the user application 212. Generally, but not necessarily, a particular value-added component may be independent of any other value-added component of a same user application 212.

In some embodiments, a value-added component may have one or more sub-components. For instance, in the example of the "mathematical symbols" add-in for the word processing program, possible sub-components may include "calculus symbols," "graphing symbols," "matrix symbols," etc. Thus, each sub-component of a specific value-added component may append additional discrete functionality to the specific value-added component itself. Similar to value-added components, a particular sub-component of a particular value-added component may be typically (but not necessarily) independent of any other sub-component of the particular value-added component.

A given user application 212 may be able to be augmented by one or more different available value-added components. The list of value-added components 215 corresponding to the user application 215 may be stored in the memory 205 using any data storage configuration or format. For example, in one embodiment, a separate list of corresponding available value-added components 215 may exist in the memory for each different user application 212. In another embodiment, a single list 215 of value-added components may exist in the memory 205, with each particular list item indicating one or more particular specific user applications 212 to which an add-in corresponding to the particular list item may be appended. In another embodiment, each user application 212 may manage its own indications of various value-added components that may be added to it. Other data configurations may be possible for the list of value-added components 215.

At least a portion of the value-added components on the list 215 may not be installed on the first computing device 202. That is, at least some of the value-added components for the user application 212 may appear as a corresponding available value-added component on the list 215 but may not actually be installed in the memory 205 of the first computing device 202. In some embodiments, none of the value-added components on the list 215 may be installed on the first computing device 202. In some embodiments, some of the value-added components on the list 215 may be installed on the first computing device 202 and some value-added components on the list 215 may not be installed. The memory 205 may contain an indication of an installed status of each value-added component, e.g., currently installed on the first computing device 202 or currently not installed on the first computing device 202. The indication of the installed status may or may not be stored with the list of value-added components 215.

In addition to the list of available value-added components 215, the memory 205 may also have stored thereon computer-executable instructions for a discovery application 218. The discovery application 218 may be executed by the processor 208 and may include computer-executable instructions for providing contextual discovery of value-added components of the user application 212 and of other user applications. The discovery application 218 may use the list 215 to do so.

For example, the discovery application 218 may present a set of selectable indicators 220a-220n corresponding to value-added components on the list 215 on a given area of the display 210. In some embodiments, a separate, selectable graphical icon (220a-220n) may be displayed for each value-added component on the list 215. In some embodiments, some other indicator that is meaningful to an end-user may be used. The indicators 220a-220n may be undifferentiated based on installation status. Specifically, the end-user may not be able to distinguish a value-added component that is installed on the first computing device 202 from a value-added component that is not installed on the first computing device 202 solely based on their respective indicators (220a-220n). In fact, the end-user may be ignorant of the installation status of any value-added components of the user application 212 solely based on their respective indicators 220a-220n.

In some embodiments, the set of indicators 220a-220n may be presented on a ribbon-type graphical user interface of the display 210. In other embodiments, the set of indicators 220a-220n may be presented as drop-down menu items on a menu interface of the display 210. Indeed, the set of indicators 220a-220n may be presented on any type of user interface of the display 210, including but not limited to: a command interface, a menu interface, a toolbar, a tab bar, a task bar, a graphical user interface, an audio interface, a window (pop-up or otherwise), or other types or formats of user interface presentation mechanisms.

Upon a user selection of a particular indicator (in this example, say, indicator 220b) corresponding to a particular value-added component (in this example, say, value-added component #003 represented by reference 222) that is not installed on the first computing device 202, the discovery application 218 may obtain the particular value-added component 222 from at least one second computing device 225. The discovery application 218 may install the particular value-added component 222 in the memory 205 of the first computing device 202, and may initiate an execution of the particular value-added component 222 in conjunction with the user application 212. In some embodiments, the obtaining and the installation of the particular value-added component 220 may be hidden from an end-user. In some embodiments, the end-user may be notified that the particular value-added component 222 is not installed on the first computing device 202. In some embodiments, the end-user may be asked whether or not he or she wishes to install the particular value-added component 222, with an installation occurring only after obtaining permission from the end-user. In some embodiments, after installation, the particular value-added component 222 may require a restart of the user application 212 and/or the computing device 202 before it can be executed.

The particular value-added component 222 may be obtained from the at least one second computing device 225 by the first computing device 202 via any directly connected or networked means. For example, the first computing device 202 and the at least one second computing device 225 may be in communication via a direct connection 228 as illustrated in FIG. 2. Alternatively, the first computing device 202 and the at least one second computing device 225 may be in communication via a remote connection (not shown). In fact, the first computing device 202 and the at least one second computing device 225 may be in communication via at least one of a local, a remote, a wide-area, a public or a private network. In some embodiments, the connection may be via a client-server network or a peer-to-peer network. The network may be at least partially wired or wireless. In fact, any known networking technology may be used to support the communication between the first 202 and the at least one other second 225 computing devices in the system 200.

A unique product identification or identifier corresponding to the particular value-added component 222 or a particular combination of value-added components may be obtained, defined or determined. For example, if a user selects a value-added component A, a product identifier corresponding to the value-added component A may be determined and recorded for inventory, billing, marketing, product tracking or other purposes. If a user selects value-added components A, B, and C, a different product identifier corresponding to the bundled package of A, B and C may be obtained and recorded. A product identifier or identification may include, for example, an SKU, a UPC, a code, an alphanumeric combination, or any other known type of unique product identifier or identification.

The system 200 may provide many advantages and benefits over current component installation systems. For example, with the system 200, a user interface experience may be gracefully generalized across multiple applications to expose available end-user functionality. For a given application, the present disclosure may allow an end-user to contextually and unobtrusively discover available functionality in the context of the work that he or she is performing with the application. To the contrary, user applications of current systems typically implement respective updates, patches, and/or additional functionality in an independent and intrusive manner. For example, a particular current user application may invoke an endless stream of pop-up windows with no regard to user context at all: "A new update is available, would you like to download and install?" "Urgent security patch available, would you like to download and install?" "Would you like to load the Chinese character set?" and so on. The sheer potential number of pop-up windows across multiple user applications may quickly detract from an optimal user experience. Furthermore, current component installation systems typically require the end-user to consult a CD, website, or other storage medium in order to discover any available add-in functionality or upgrades. The end-user must take extra steps to discover available functionalities, evaluate whether or not the available functionalities would be useful for him or her, and actively download any desired functionalities.

In contrast, the present disclosure may provide the end-user with an ability to seamlessly discover and install value-added components of a user application. Upon execution of the application, an available value-added component indicator may be discretely displayed on a standard UI with no indication of an installation status. In fact, the end-user may not be aware of whether or not the available value-added component component is installed or not installed, but may perceive the available value-added component on the UI as fully installed (or, at least, fully available). Moreover, the available value-added component may be displayed on the UI only within a context of a particular task or work flow of the user application during which the available value-added component may be especially valuable. Thus, the end-user may easily and contextually discover any available value-added components that may be particularly useful for the task or workflow at hand.

Upon selection of a given value-added component indicator, the first computing device may obtain the corresponding computer-executable instructions (either with or without user notification of knowledge), install the given value-added component, and execute the given value-added component. In this manner, an end-user may experience a seamless discovery, installation and integration of value-added components, without needing to actively search for possibly useful add-in components and evaluate their appropriateness, and without being constantly bothered by multiple pop-ups. For a provider of the value-added component and/or user application, an association of end-user enabled value-added components with product SKUs or other identifications provides ease of product tracking, billing, warranty, and other functions.

Another advantage that the system 200 may provide is resource optimization. No longer are all value-added components of a user application are required to be comprehensively loaded or installed onto the first computing device. Instead, the first computing device may obtain various value-added components on an as-needed basis. Only the value-added components that an end-user desires to use may be actually installed onto the first computing device. Accordingly, significant memory savings may be realized, and performance of the application itself may be enhanced. These benefits quickly aggregate and are especially realized when the system 200 supports multiple user applications each including multiple possible value-added components.

Figure 3:
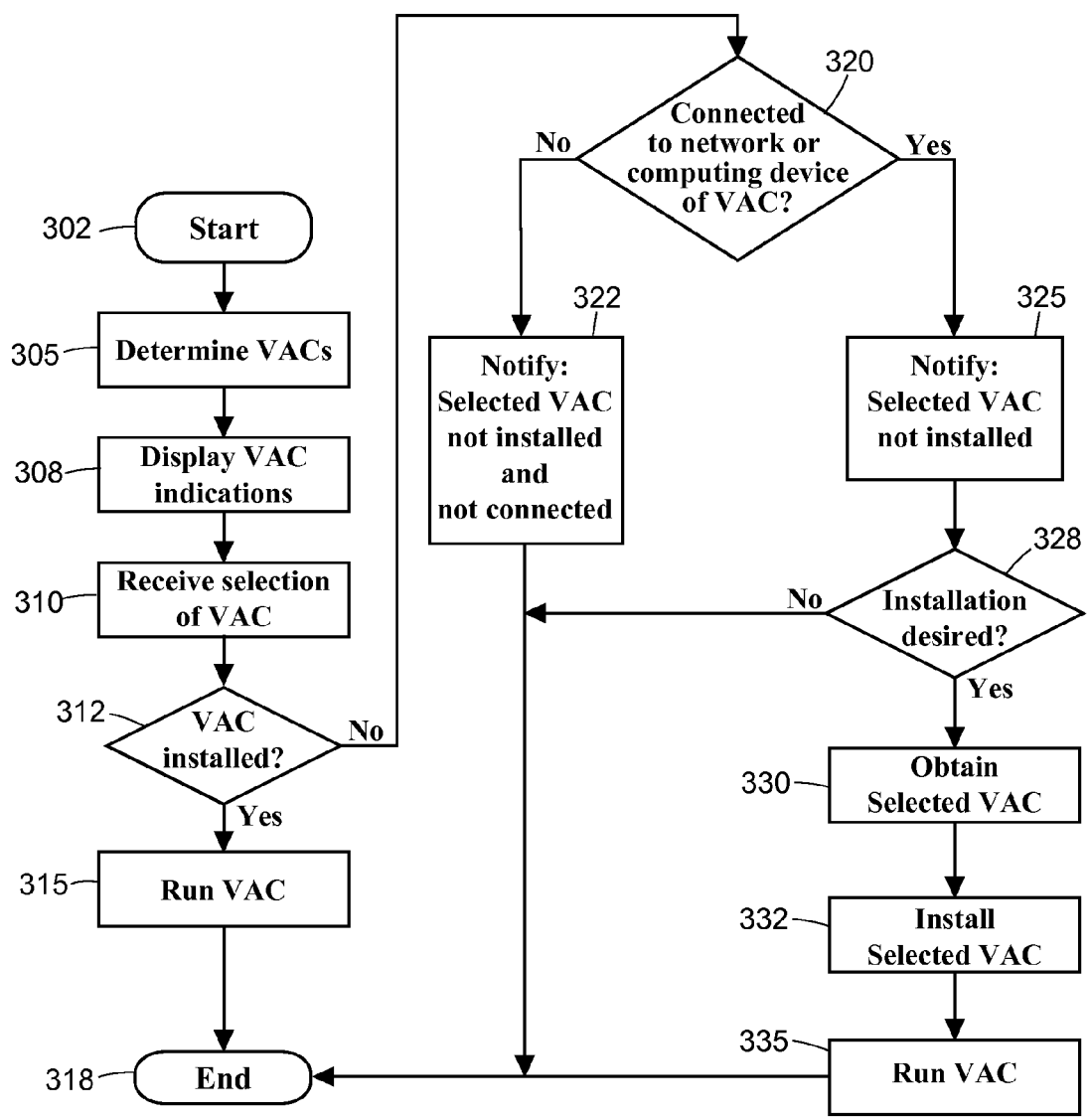
FIG. 3 illustrates an exemplary embodiment of a method for providing contextual discovery of value-added components of an application.

FIG. 3 illustrates an exemplary embodiment of a method 300 for providing contextual discovery of value-added components of an application. Embodiments of the method 300 may operate in conjunction with the computing device 110 of FIG. 1 and with the system 200 of FIG. 2.

At the start 302 of the method 300, in conjunction with a start-up of an application on a computing device, the method 300 may determine one or more value-added components that may be available for augmenting the application 305. The method 300 may also determine whether or not the one or more value-added components are installed on the computing device. At the block 308, the method 300 may display an indicator for each of the one or more value-added components. In some embodiments, the method 300 may display indicators for only the value-added components that are not installed on the computing device, and in some embodiments, the method 300 may display indicators for both the value-added components that are not installed on the computing device and the value-added components that are installed on the computing device.

The indicators corresponding to the one or more value-added components may be displayed 308 on a user interface display of the computing device. In some embodiments, each indicator may be presented as a separate, user-selectable graphical icon. Each indicator, however, may not be limited to only a user-selectable graphical icon format but may displayed using any format of indicator, including graphical, textual, audio, or some other form or combination of forms. The indicators may be displayed 308 in a particular area of the display, such as a window (pop-up or otherwise), a drop-down menu, a ribbon-style menu, a taskbar, a tool bar, a tab bar, or some other area. In an exemplary embodiment, each indicator may be presented as a user-selectable graphical icon on a ribbon-type user interface.

The indicators may not differentiate between installation statuses of the various corresponding value-added components. That is, an end-user may not be able to distinguish, based solely on the indicators, which value-added components are presently installed at the computing device and which are not presently installed.

At block 310, an indication of a user selection of one of the indicated, displayed value-added components may be received. If the selected value-added component is presently installed as determined by block 312, the method 300 may simply execute the selected value-added component 315 and end 318.

If the block 312 determines that the selected value-added component is not presently installed on the computing device, then the method 300 may proceed to block 320. Block 320 may determine whether or not a connection to one or more other computing devices on which the selected value-added component may be found exists. For example, the block 320 may determine if a connection to one or more website servers via the Internet exists. In another example, the block 320 may determine whether a private Local Area Network is accessible.

If the block 320 determines that a connection to the one or more other computing devices does not exist, the method 300 may display a dialog box or other type of notification indicating that the selected value-added component is not presently installed on the computing device, and that no connection exists to the one or more other computing devices from which the selected value-added component may be obtained 322. The method 300 may then end 318. At sometime thereafter, if the computing device establishes a connection to the one or more other computing devices, the method 300 may be re-started at the block 310.

If the block 320 determines that a connection to the one or more other computing devices does exist, the method may display a dialog box or some other type of notification indicating that the selected value-added component is not presently installed on the computing device 325. The method 300 may ask the end-user if he or she would like to install the selected value-added component, and may receive a user choice regarding installation at block 328. If the user indicates that he or she does not wish to install the selected value-added component, the method 300 may end 318.

If the user indicates at the block 328 that he or she wishes to install the selected value-added component, the method 300 may obtain the selected value-added component 330. In some embodiments, the method 300 may obtain the selected value-added component 330 from the one or more other computing devices via a direct connection or via a network. For example, the method 300 may obtain the selected value-added component 330 via Internet connections to one or more peer-to-peer nodes. In another example, the method 300 may obtain the selected value-added component 330 via a directly connected computing device. In fact, the method 300 may obtain the selected value-added component 330 via any known connection configuration with any number of other computing devices.

Next, the method 300 may install the obtained, selected value-added component 332 and may execute or run the selected value-added component 335 in conjunction with the application. In some embodiments, the method 300 may ask the end-user to restart the application or the computing device before the selected value-added component may be executed or run 335. Finally, the method 300 may end 318.

Note that in some embodiments, the blocks 325 and 328 may be optional. For example, the method 300 may silently and automatically install any selected value-added components without any notification to the end-user at all. In another example, a permission of whether or not to install a particular or any value-added components may be set at an administrative level, such as by a system administrator with management permissions for a group of computing devices. Thus, the blocks 325 and 328 may only be performed by the method 300 if the end-user is the system administrator. In the example illustrated by FIG. 3, a general end-user-level permission for installation is implemented by the inclusion of the blocks 325 and 328. In some embodiments, the method 300 may determine a level of installation permission, and dialog with the end-user and/or install the selected value-added components accordingly.

In some embodiments, the indicators corresponding to available but not installed value-added components may be displayed in first area of the display (block 308), and the indicators corresponding to available and installed value-added components may be displayed in a second area of the display (block 308) separate from the first area. In these embodiments, if, at some point in time, all available but not installed value-added components are eventually installed, the first area may be hidden or may disappear, and indicators of the newly installed value-added components may be moved to be presented in the second area of the display.

As discussed previously for the system 200, each value-added component itself may have one or more sub-components that may each, in turn, be displayed 308, selected 310, obtained 330, installed 332 and executed 335 by the method 300 in a manner similar to that performed for a selected value-added component. In some embodiments, a sub-component may be an actual function or routine of a value-added component, and may be automatically (and perhaps in some cases silently) obtained, installed and executed 335 on an as-needed basis. In this manner, an amount of memory required to store computer-executable instructions for value-added components and/or any sub-components may be optimized. The method 300 may only install computer-executable instructions for desired value-added components and/or sub-components on an as-needed basis, instead of having to take up valuable memory for a complete set of value-added components and/or sub-components that may be rarely, if ever, used.

Figure 4:
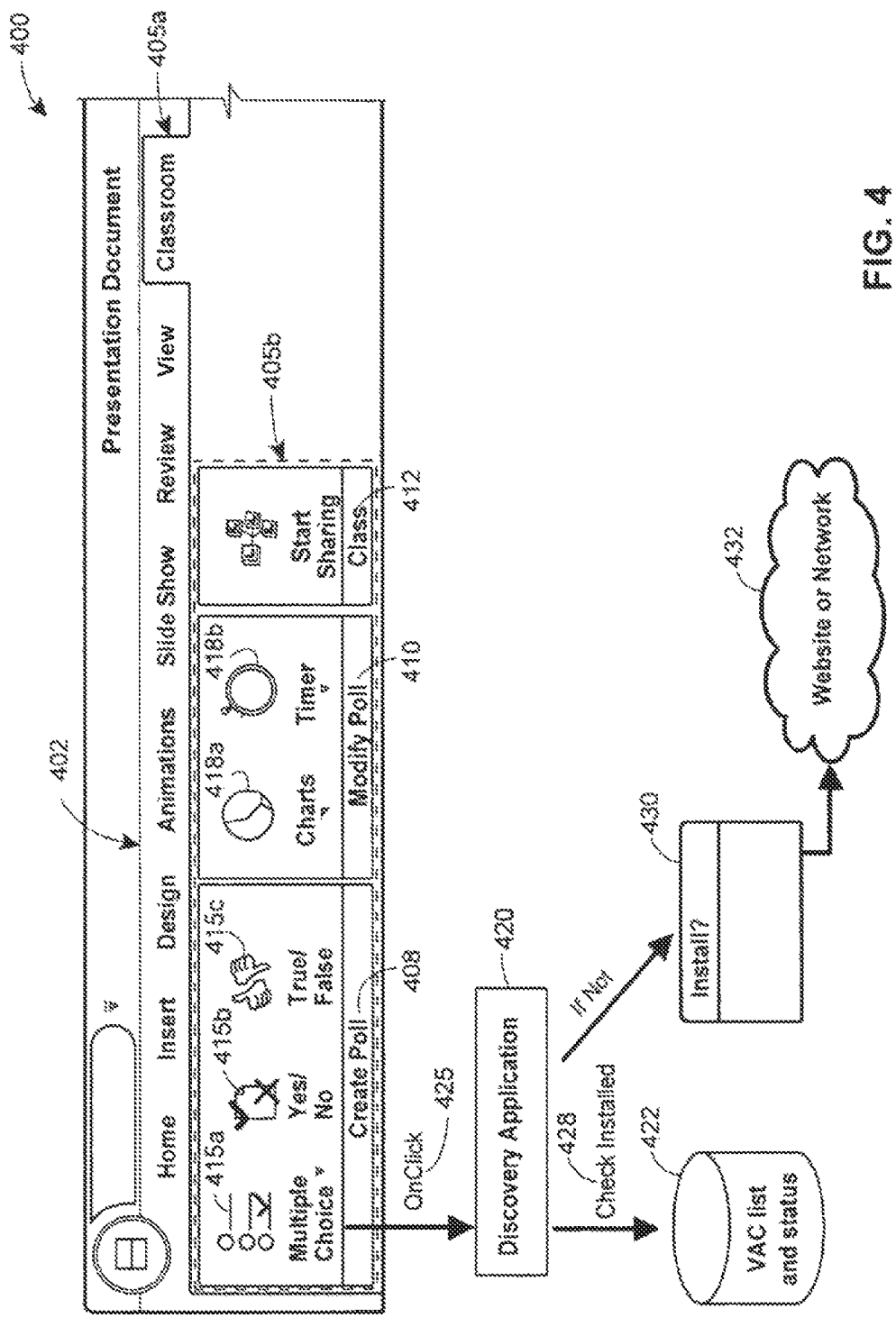
FIG. 4 is an example of a user interface (UI) for providing contextual discovery of value-added components and an accompanying logic flow.

FIG. 4 is an example of a user interface 400 for providing contextual discovery of value-added components and a description of an accompanying scenario incorporating the user interface 400. Embodiments of the example 400 may be used in conjunction with the computing device 110 of FIG. 1, the system 200 of FIG. 2 and/or the method 300 of FIG. 3. The example 400 is merely an illustrative embodiment and is not meant to limit in any way the system 200, the method 300, or any embodiments of a user interface for providing contextual discovery of value-added components.

In the example 400 illustrated by FIG. 4, the user interface 400 may be a screen shot of a user interface of a presentation program for producing presentation slides. The presentation program may be being run by an end-user on a computing device, and the user interface 400 may be displayed on a screen or display of the computing device.

The portion of the user interface 400 displayed in FIG. 4 may include a tab bar 402 in a display area of the screen. The tab bar 402 may include tabs or other selectable indicators that may allow the end-user to access various functions and/or objects of the presentation program (in this example, "Insert," "Design," "Animations," and so on.) A particular tab "Classroom" 405a on the tab bar 402 has been selected by the end-user, and a display area 405b corresponding to the "Classroom" tab 405a is exhibited. The display area 405b may include selectable icons for functions and value-added components relating to "Classroom" 405a that may be used by the end-user in managing presentation slides in a classroom setting, e.g., "Create Poll" 408, "Modify Poll" 410, and "Class" 412. Note that in this particular example 400, the end-user may not be able to distinguish whether or not the components 408, 410, and 412 are installed or uninstalled, nor may the end-user be able to distinguish whether or not the components 408, 410, 412 are basic or add-in functionalities for the "Classroom" 405 tab.

The "Create Poll" 408 component is illustrated as having three sub-components: "Multiple Choice" 415a, "Yes/No" 415b, and "True/False" 415c. The "Modify Poll" 410 component is illustrated as having two sub-components: "Charts" 418a and "Timer" 418b. The sub-components "Multiple Choice" 415a, "Charts" 418a and "Timer" 418b each have an associated marker that may indicate to the end-user further subdivision of functionality or features, respectively, and may be selected by the end-user in order to view the subdivisions. Other means or mechanisms for indicating further subdivision or sub-components of a given value-added component may be possible.

Upon the user selection of the "Classroom" tab 405a, a discovery application 420, such as the discovery application 218 illustrated in FIG. 1, may automatically provide selectable graphical icons or other types of indicators corresponding to some or all available additional functionalities, value-added components, sub-components, etc. 408-418 of the "Classroom" tab 405a for presentation in the display area 405b. The presented icons or indicators may be determined and based on information in a database 422 or memory.

In the scenario illustrated by the example 400, the end-user has performed an on-click event 425 of the "Multiple Choice" icon 415a. In response to the user selection of the icon 415a, the discovery application 420 may determine whether or not the "Multiple Choice" 415a value-added component is installed 428 at the computing device based on data in the memory 422.

If the "Multiple Choice" 415a value-added component is not installed, the discovery application 420 may notify the end-user via a dialog window 430, and may request whether or not the end-user wishes to install the "Multiple Choice" 415a value-added component. If the end-user affirms installation, the discovery application 420 may obtain the "Multiple Choice" 415a value-added component from a website, 432, other computing device or network and install the "Multiple Choice" value-added component 415a onto the computing device. The discovery application 420 may then execute the installed "Multiple Choice" 415a value-added component or may prompt the end-user to execute the "Multiple Choice" 415a value-added component (e.g., if a restart of the computing device is required after installation).

The example 400 of FIG. 4 clearly illustrates how the present disclosure provides a highly integrated user experience. An end-user who installs the "Classroom" 405a value-added component of the presentation program may immediately discover and download or obtain related value-added components and sub-components. No longer is the end-user required to browse a website or separate CD/media storage device to find available value-added components associated with the "Classroom" 405a program. Instead, the available value-added components are immediately presented upon selection of the "Classroom" 405a tab. Furthermore, no longer is precious memory on the computing device taken up by a completely installed set of "Classroom" 405a components and sub-components. Instead, UI indicators for the various components and sub-components are displayed, but the actual computer-executable instructions for a specific component or sub-component may not be installed onto the computing device until the end-user so requests, allowing memory and execution time of the application to be minimized. In this manner, the present disclosure provides an integrated UI for value-added components of one or more applications, each of which may be installed (with possibly their associated sub-components) on demand when the end-user discovers and designates a corresponding selection via a UI control.

Moreover, the present disclosure provides a discoverability of value-added component and sub-components on an as-needed basis while the end-user is working or operating contextually within an appropriate instance or context of the specific application. Unlike intrusive pop-up windows that may notify the end-user of updates (and in fact, interrupt the end-user) with no regard to a specific task that the end-user is performing, the indicators corresponding to available value-added components may be displayed contextually. In particular, the present disclosure may display indicators of available value-added components when the end-user accesses a particular functionality for which the available value-added components may be useful. This beneficial characteristic also enhances the seamless and integrated user experience.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method comprising:
   displaying, at a first computing device, a menu interface of an installed application being run on the first computing device, the menu interface including selectable tabs for accessing functions supported by the installed application;
   displaying, within the menu interface of the installed application, a particular selectable tab for accessing add-in components that provide supplemental functionality to the installed application;
   receiving a user selection of the particular selectable tab;
   accessing, by a discovery application on the first computing device, a list of available add-in components corresponding to the installed application, wherein:
      one or more of the available add-in components on the list are not installed on the first computing device, and
      the list is accessed by the discovery application from memory of the first computing device;
   presenting, by the discovery application, a set of selectable icons corresponding to the available add-in components on the list in a display area corresponding to particular selectable tab;
   receiving a user selection of a selectable icon corresponding to a particular add-in component that is not installed on the first computing device;
   obtaining, by the discovery application, the particular add-in component from a second computing device that is in communication with the first computing device via a network;
   installing, by the discovery application, the particular add-in component on the first computing device; and
   initiating, by the discovery application, execution of the particular add-in component to supplement the functions supported by the installed application, wherein the particular add-in component can be subsequently disabled or uninstalled in response to user input.

2. The method of claim 1, further comprising obtaining a unique product identifier corresponding to the particular add-in component.

3. The method of claim 1, further comprising displaying a notification indicating that the particular add-in component is not installed on the first computing device.

4. The method of claim 3, further comprising:
   receiving an indication of a user preference to install the particular add-in component; and
   obtaining the particular add-in component based on the indication of the user preference.

5. The method of claim 1, further comprising:
   displaying a notification indicating that the first computing device is not in communication with the second computing device; and
   establishing a network connection between the first computing device and the second computing device.

6. The method of claim 1, wherein one or more selectable icons in the set of selectable icons can be hidden in response to user input.

7. A system comprising:
   a processor configured to execute computer-executable instructions; and
   memory storing computer-executable instructions for:
      displaying, on a display of a first computing device, a menu interface of an installed application being run on the first computing device, the menu interface including selectable tabs for accessing functions supported by the installed application;
      displaying, within the menu interface of the installed application, a particular selectable tab for accessing add-in components that provide supplemental functionality to the installed application;
      receiving a user selection of the particular selectable tab;
      accessing, by a discovery application on the first computing device, a list of available add-in components corresponding to the installed application, wherein:
         one or more of the available add-in components on the list are not installed on the first computing device, and
         the list is accessed by the discovery application from the memory;
      presenting, by the discovery application, a set of selectable icons corresponding to the available add-in components on the list in a display area corresponding to the particular selectable tab;
      receiving a user selection of a selectable icon corresponding to a particular add-in component that is not installed on the first computing device;
      obtaining, by the discovery application, the particular add-in component from a second computing device that is in communication with the first computing device via a network;
      installing, by the discovery application, the particular add-in component on the first computing device; and
      initiating, by the discovery application, execution of the particular add-in component to supplement the functions supported by the installed application, wherein the particular add-in component can be subsequently disabled or uninstalled in response to user input.

8. The system of claim 7, wherein the memory further stores computer-executable instructions for:
   displaying a notification indicating that the first computing device is not connected to the network; and
   establishing a network connection between the first computing device and the second computing device.

9. The system of claim 7, wherein the memory further stores computer-executable instructions for:
displaying a notification indicating that the particular add-in component is not installed on the first computing device.

10. The system of claim 9, wherein the memory further stores computer-executable instructions for:
receiving an indication of a user preference to install the particular add-in component; and
obtaining the particular add-in component based on the indication of the user preference.

11. The system of claim 7, wherein:
the obtaining and installing of the particular add-in component are based on an installation permission level.

12. The system of claim 7, wherein:
the obtaining, installing, and execution of the particular add-in component are automatically performed in response to the user selection of the selectable icon corresponding to the particular add-in component.

13. The system of claim 7, wherein the memory further stores computer-executable instructions for:
obtaining a unique product identifier corresponding to the particular add-in component.

14. A computer-readable storage medium storing computer-executable instructions that, when executed by a processor of a first computing device, cause the first computing device to perform a method comprising:
displaying a menu interface of an installed application being run on the first computing device, the menu interface including selectable tabs for accessing functions supported by the installed application;
displaying, within the menu interface of the installed application, a particular selectable tab for accessing add-in components that provide supplemental functionality to the installed application;
receiving a user selection of the particular selectable tab;
accessing, by a discovery application on the first computing device, a list of available add-in components corresponding to the installed application, wherein:
one or more of the available add-in components on the list are not installed on the first computing device, and the list is accessed by the discovery application from memory of the first computing device;
presenting, by the discovery application, a set of selectable icons corresponding to the available add-in components on the list in a display area corresponding to the particular selectable tab;
receiving a user selection of a selectable icon corresponding to a particular add-in component that is not installed on the first computing device;
obtaining, by the discovery application, the particular add-in component from a second computing device that is in communication with the first computing device via a network;
installing, by the discovery application, the particular add-in component on the first computing device; and
initiating, by the discovery application, execution of the particular add-in component to supplement the functions supported by the installed application, wherein the particular add-in component can be subsequently disabled or uninstalled in response to user input.

15. The computer-readable storage medium of claim 14, further storing computer-executable instructions for:
displaying a notification indicating that the first computing device is not connected to the network; and
establishing a network connection between the first computing device and the second computing device.

16. The computer-readable storage medium of claim 14, further storing computer-executable instructions for:
displaying a notification indicating that the particular add-in component is not installed on the first computing device;
receiving an indication of a user preference to install the particular add-in component; and
obtaining the particular add-in component based on the indication of the user preference.

17. The computer-readable storage medium of claim 14, wherein:
the obtaining and installing of the particular add-in component are based on an installation permission level.

18. The computer-readable storage medium of claim 14, wherein:
the obtaining, installing, and execution of the particular add-in component are automatically performed in response to the user selection of the selectable icon corresponding to the particular add-in component.

19. The computer-readable storage medium of claim 14, further storing computer-executable instructions for:
obtaining a unique product identifier corresponding to the particular add-in component.

20. The computer-readable storage medium of claim 14, further storing computer-executable instructions for:
hiding one or more selectable icons in the set of selectable icons in response to user input.

* * * * *